UNITED STATES PATENT OFFICE.

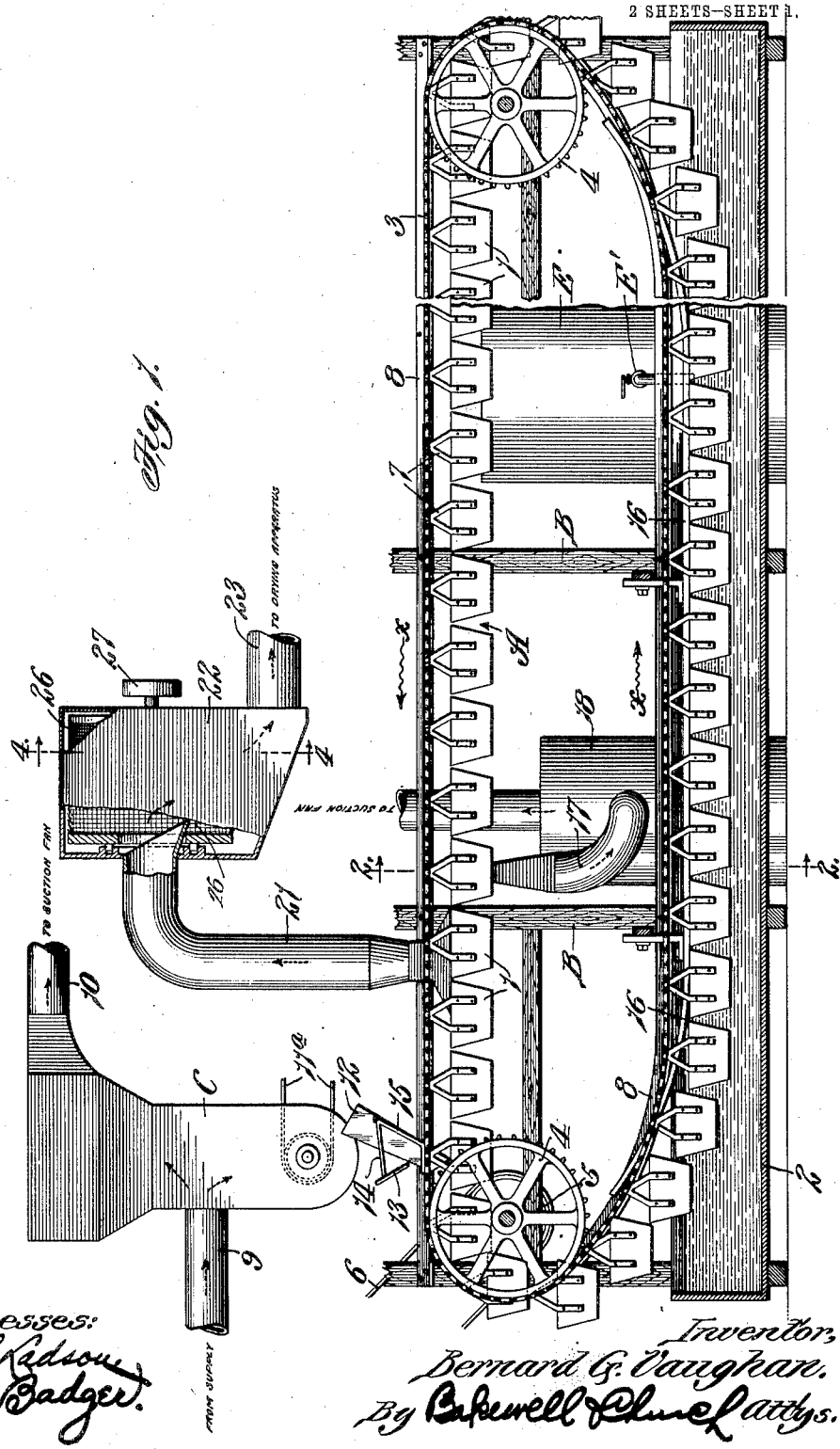

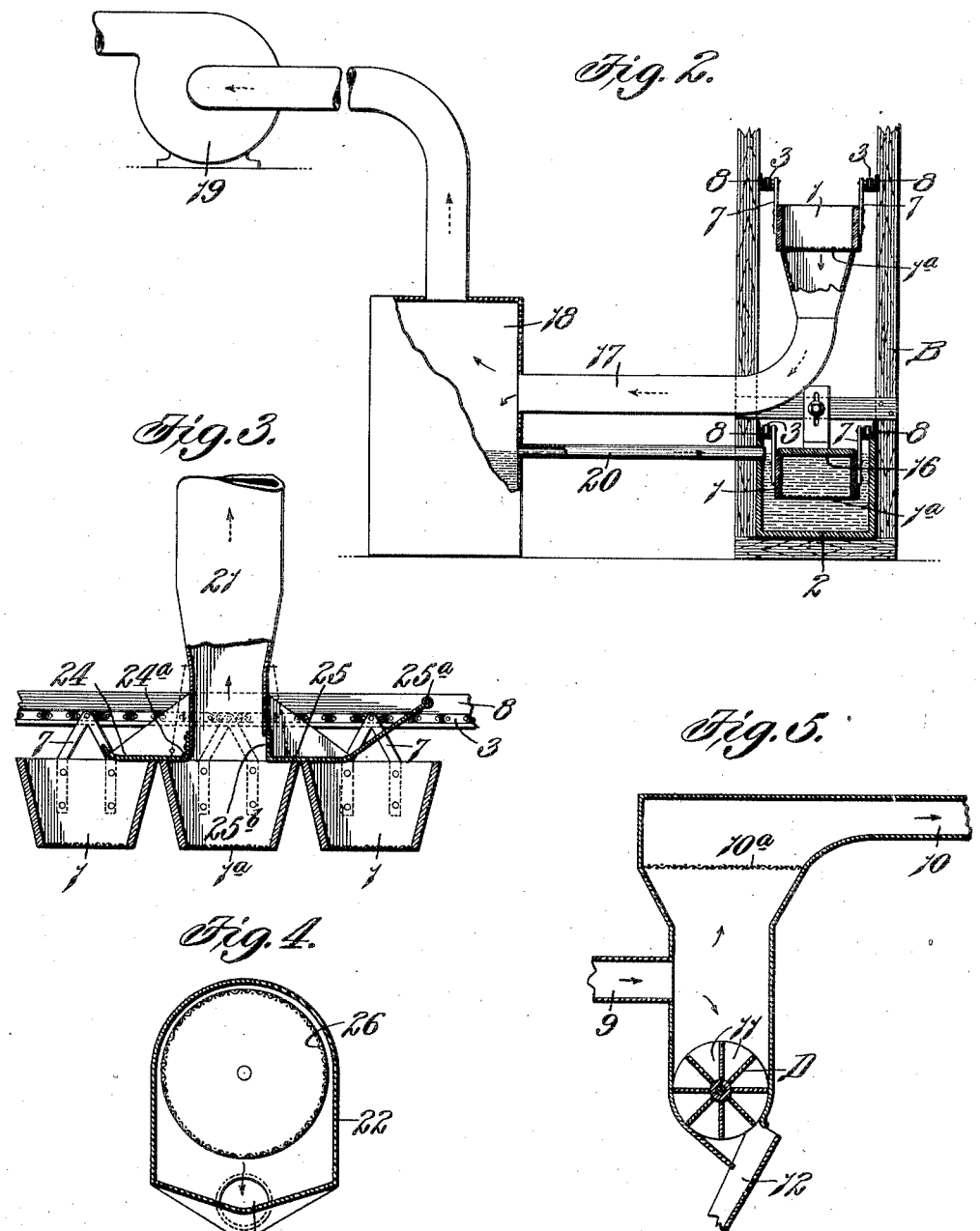

BERNARD GEORGE VAUGHAN, OF JOLIET, ILLINOIS, ASSIGNOR TO NATIONAL MATCH COMPANY, OF JOLIET, ILLINOIS, A CORPORATION OF ILLINOIS.

IMPREGNATING APPARATUS.

1,116,649.  Specification of Letters Patent.  Patented Nov. 10, 1914.

Application filed July 19, 1913. Serial No. 779,958.

*To all whom it may concern:*

Be it known that I, BERNARD G. VAUGHAN, a citizen of the United States, residing at Joliet, Illinois, have invented a certain new and useful Improvement in Impregnating Apparatuses, of which the following is a full, clear, and exact description, such as will enable others skilled in the art to which it appertains to make and use the same.

This invention relates to apparatuses for impregnating match-splints and similar articles with a liquid solution.

The main object of my invention is to provide an apparatus that will automatically draw match-splints or similar articles from a source of supply, immerse them in a solution so as to impregnate them, and thereafter deliver them to a drier or to the point where they are to be used or treated further.

Another object is to provide an impregnating apparatus that comprises a conveyer equipped with carriers which travel through a tank that contains a solution, means for drawing articles to be treated from a source of supply and delivering them to said carriers, and means for automatically removing the articles from said carriers when the carriers reach a certain point in the path of travel of the conveyer, and separate the articles which adhere to each other and introduce them into a conduit through which the articles travel to the point where they are to be used or treated further.

Other objects and desirable features of my invention will be hereinafter pointed out.

Figure 1 of the drawings is a side elevational view of an apparatus constructed in accordance with my invention for impregnating match-splints; Fig. 2 is a cross sectional view taken on the line 2—2 of Fig. 1; Fig. 3 is an enlarged vertical sectional view of the suction pipe through which the splints are removed from the carriers of the conveyer; Fig. 4 is a vertical sectional view taken on the line 4—4 of Fig. 1; and Fig. 5 is a vertical sectional view of the vacuum chamber into which the splints are drawn from the source of supply and then delivered in batches into the carriers of the conveyer.

Referring to the drawings which illustrate the preferred form of my invention, A designates an endless conveyer provided with a plurality of carriers 1 which travel through a tank 2 that contains a solution for treating match-splints, the conveyer herein shown being provided with endless sprocket-chains 3 that travel over sprocket-wheels 4, one pair of which are connected to a shaft provided with a pulley 5 around which a drive belt 6 passes. The carriers 1 preferably consist of buckets having perforated bottoms $1^a$ that may be formed from wire screening, and said buckets are provided with rigid side arms 7 that are pivotally connected at their upper ends to the sprocket-chains 3 of the conveyer. A stationary supporting structure B is provided with tracks 8, preferably formed from angle-bars, as shown in Fig. 2, over which the sprocket-chains 3 travel so as to sustain the weight of the carriers 1 and thus prevent the conveyer from sagging intermediate the pairs of sprocket-wheels 4 at each end of the conveyer.

The match-splints are drawn from a source of supply, not shown, through a conduit 9 that leads into a vacuum chamber C from which the air is exhausted by a suction fan, not shown, that communicates with a pipe 10 which branches from the upper end of the vacuum chamber, said vacuum chamber being so designed that the splints that are sucked into same through the conduit 9 will drop downwardly into pockets 11 formed in a rotatable delivering device D which intermittently discharges batches of splints from the vacuum chamber into a chute 12 arranged above the conveyer A, as shown in Fig. 1, said device D being rotated continuously by means of a belt $11^a$ that surrounds a pulley on the shaft of the device D. The chute 12 is provided with a cut-off valve 13, and whenever one of the buckets or carriers 1 of the conveyer passes under said chute the valve 13 is operated so as to permit the batch of splints in the chute to drop downwardly into said bucket. In the apparatus herein shown the cut-off valve 13 is carried by arms 14 which are pivotally connected to the chute 12, and one of said arms is provided with an extension 15 which is so arranged that when the cut-off valve 13 is closed said extension will lie in such a position that it will be struck by the upper end of one arm 7 of the bucket 1 which is just about to pass under the chute 12, thereby causing the valve 13 to be raised or opened so that the splints in the chute 12 will be discharged into the bucket 1 when said bucket passes under the chute. When the bucket that has just been filled passes beyond the chute, the cut-off valve 13 moves automatically back into position to close the chute.

The conveyer A travels in the direction indicated by the arrows $x$ in Fig. 1 so as to cause the buckets 1 to enter the tank 2 immediately after the splints have been introduced into said buckets, the tank 2 being of sufficient length to cause the splints to become thoroughly impregnated with the solution in the tank while they are being carried through said solution. After the buckets 1 move upwardly out of the tank, the solution drains out of the buckets back into the tank while the buckets are traveling to the point where the splints are removed from the buckets. In order to prevent the splints from floating out of the buckets or carriers 1 while said carriers are traveling through the solution in the tank 2, I have equipped said tank with a stationary member 16 arranged in such a position that the buckets 2 will pass under same and slide along the under side of said member while they are traveling longitudinally through the tank 2, the opposite ends of the member 16 being curved upwardly adjacent the ends of the tank, and said member being so arranged with relation to the tracks 8 on which the chains 3 of the conveyer A travel that it will bear upon the upper edges of the buckets 1 while said buckets are traveling through the solution in the tank 2. The conveyer A is long enough so that most of the solution will drain out of the buckets 1 before the buckets reach the point where the splints are removed from same, but in order to insure the removal of any solution that fails to drain out of the buckets I have provided the apparatus with a suction pipe 17 arranged in such a manner that the buckets 1 will pass over the upper end of same before said buckets reach the point where the splints are removed therefrom, said suction pipe 17 leading into a tank 18 from which the air is exhausted by means of a fan 19, as shown in Fig. 2. The solution that is extracted from the buckets and from the splints in the buckets by means of the suction in the pipe 17, flows through said pipe into the tank 18, and when the solution in said tank 18 rises above a certain level it flows back into the tank 2 through an overflow pipe 20 shown in Fig. 2. The solution is supplied to the tank 2 from a container E which is preferably provided with a controlling valve E' that can be so regulated that a small quantity of solution will be supplied to the tank 2 continuously so as to automatically replenish the bath in said tank in which the splints are immersed.

At a point between the suction pipe 17 and the chute 12 through which the splints are introduced into the conveyer, means is provided for removing the splints from the buckets 1. The means herein shown consists of a suction pipe 21 through which the splints are sucked out of the buckets 1, said pipe 21 leading into a chamber 22 from which the air is exhausted by means of a suction pipe 23 that leads to a drier or to the point where the splints are to be used or treated further. The lower end of the pipe 21 terminates above the buckets 1 and is so shaped that it corresponds approximately to the width of the buckets 1, and horizontally-disposed flaps or cover plates 24 and 25 are connected to the lower end of the pipe 21 so as to bear upon the front and rear edges of the bucket 1 that alines with the lower end of the pipe 21 and thus completely close the upper end of the bucket so that the suction in said pipe will be exerted on the splints in the bucket. As soon as a bucket passes under the lower end of the pipe 21 the suction in said pipe causes the splints in the bucket to be drawn upwardly out of the bucket into the chamber 22. The splints are wet and consequently adhere to each other when they are removed from the buckets, and in order to separate the splints before they enter the pipe 23 that leads to the machine in which the splints are to be dried or treated further, I have arranged a rotatable screen 26 in the chamber 22, as shown in Figs. 1 and 4, so as to tumble and agitate the splints that enter the chamber 22 through the pipe 21, said screen 26 being provided with a pulley 27 that coöperates with a drive belt, not shown. In view of the fact that the mass of splints in the buckets 1 do not always lie below or flush with the upper edges of the buckets, I have mounted the flaps or cover plates 24 and 25 in such a manner that they can swing upwardly sufficiently to permit the buckets to pass under same in case the splints project upwardly above the upper edges of the buckets, the plate 24 being pivotally connected at $24^a$ to the lower end of the pipe 21 and the plate 25 being pivotally connected at $25^a$ to the upper track 8 and provided at its free end with an upwardly projecting flange $25^b$ that normally closes a slot or cut-out portion in the lower end of the pipe 21.

With an apparatus of the construction above-described, the splints or articles to be treated are drawn from the source of supply into the vacuum chamber C, the splints being prevented from escaping from said chamber through the suction pipe 10 by means of the screen $10^a$ shown in Fig. 5. The splints that enter the vacuum chamber C fall downwardly into the pockets of the rotatable delivering device D and are discharged intermittently into the chute 12.

Each bucket that travels under the chute 12 receives a batch of splints, and while the buckets are traveling through the tank 2 the splints are prevented from escaping from the buckets by means of the stationary member 16 that extends longitudinally of the tank 2. The perforated bottoms of the buckets permit the solution to drain out of the buckets as soon as the buckets move upwardly out of the tank 2, and when the buckets pass over the suction-pipe 17 any solution which remains in the buckets or on the splints in the buckets is sucked into the tank 18 by the suction in the pipe 17. Thereafter, when the buckets travel past the lower end of the pipe 21, the splints are sucked upwardly out of the buckets and are delivered into the rotatable screen 26 in the chamber 23, the movement of said screen tumbling and agitating the splints sufficiently to separate the splints that stick together before the splints pass through the meshes of said screen and enter the suction pipe 23 that leads to the point where the splints are to be used or treated.

Having thus described my invention, what I claim as new and desire to secure by Letters Patent is:

1. An impregnating apparatus comprising a conveyer, a tank containing a solution through which said conveyer travels, means for introducing the articles to be impregnated into said conveyer, pneumatic means for removing the impregnated articles from the conveyer, and means for agitating the articles after they have been removed from the conveyer so as to separate the articles that stick to each other.

2. An impregnating apparatus comprising an endless conveyer, a tank containing a solution through which said conveyer travels, a vacuum chamber into which the articles to be treated are drawn from a source of supply, means for discharging batches of articles from said vacuum chamber intermittently into said conveyer, a suction-pipe arranged in the path of travel of the conveyer for removing the articles from the conveyer after they have been impregnated, and means for agitating the articles that pass through said suction-pipe so as to separate those that stick to each other.

3. An impregnating apparatus comprising an endless conveyer provided with carriers or buckets having perforated bottoms, a tank containing a solution through which said buckets travel, means for introducing a batch of the articles to be treated into each bucket of the conveyer when it passes a certain point, and pneumatic means for removing the impregnated articles from said buckets at a certain point in the path of travel of the conveyer.

4. An impregnating apparatus comprising an endless conveyer provided with carriers or buckets having perforated bottoms, a tank containing a solution through which said buckets travel, means for introducing a batch of the articles to be treated into each bucket of the conveyer when it passes a certain point, a suction-pipe whose open end is presented to the perforated bottoms of said buckets after they leave said tank so as to remove the solution which fails to drain off of the articles in the buckets, pneumatic means for removing the impregnated articles from the buckets at a certain point in the path of travel of the conveyer, and means for agitating the articles so as to separate those that stick to each other.

5. An impregnating apparatus comprising an endless conveyer provided with carriers or buckets having perforated bottoms, a tank containing a solution through which said buckets travel, a feed-chute provided with a cut-off valve, means for delivering the articles to be treated into said feed-chute, means for opening said cut-off valve automatically whenever a bucket comes into alinement with the feed-chute so that a batch of the articles to be treated can enter the bucket, and a suction-pipe for sucking the impregnated articles out of the buckets and delivering them to the point where the articles are to be used or further treated.

6. An impregnating apparatus comprising a conveyer, a tank containing a solution through which said conveyer travels, means for delivering the articles to be treated to said conveyer, a suction-pipe for removing the articles from said conveyer at a certain point in the path of travel of the conveyer, and a rotatable screen into which the articles are discharged from said suction-pipe.

7. An impregnating apparatus comprising an endless conveyer provided with buckets which have perforated bottoms, a tank containing a solution through which said buckets travel, means for delivering matchsplints or similar articles to said buckets, a stationary member arranged in such a position that it will form a closure for the buckets while they are submerged in the solution in said tank and will thus prevent the splints from escaping from the buckets, and pneumatic means for sucking the splints out of the buckets at a certain point in the path of travel of the conveyer.

8. An impregnating apparatus comprising an endless conveyer provided with buckets having perforated bottoms, a tank containing a solution through which said buckets travel, means for filling the buckets with the articles to be impregnated when said buckets pass a certain point, a suction-pipe having its open end presented to the bottoms of said buckets so as to remove the solution that fails to drain from the buckets and the articles therein after the buckets have left said tank, and means for collecting the solution from said suction-pipe and delivering it back into said tank.

9. An impregnating apparatus comprising a vacuum chamber into which the articles to be treated are drawn from a source of supply, a rotatable device for discharging batches of the articles from said vacuum chamber intermittently, a chute for receiving the articles that are discharged from said chamber, an endless conveyer having buckets that travel under said chute, means for controlling the passage of the articles from said chute into said buckets, a tank containing a solution through which said buckets travel, a suction-pipe for removing the impregnated articles from said buckets, said suction-pipe having movable flaps that bear upon the upper edge of the bucket which alines with said pipe and thus cause the suction in said pipe to be exerted on the articles in the bucket, and means for agitating the articles after they are removed from the bucket so as to separate the articles that stick together.

In testimony whereof I hereunto affix my signature in the presence of two witnesses, tnis 14th day of July 1913.

BERNARD GEORGE VAUGHAN.

Witnesses:
    HENRY LESER,
    LEO MICHAEL HERKERT.